Patented Jan. 8, 1952

2,581,925

UNITED STATES PATENT OFFICE 2,581,925

1,1-DICHLOROBUTADIENE-1,3, ITS PREPARATION AND POLYMERS

Grant Crane and Kenneth C. Eberly, Akron, Ohio, assignors to The Firestone Tire & Rubber Company, Akron, Ohio, a corporation of Ohio No Drawing. Application October 9, 1948,
Serial No. 53,752

6 Claims. (Cl. 260—82.1)

This invention relates to a novel chemical compound, 1,1-dichlorobutadiene, its preparation and its polymers and copolymers.

The compound of this invention may conveniently be prepared from propylene and trichlorobromomethane by the following series of reactions (A)

$$CBrCl_3 + CH_2=CH-CH_3 \xrightarrow[\text{U. V. irradiation or other source of free radicals}]{} Cl_3C-CH_2-CHBr-CH_3$$

(B)

$$Cl_3C-CH_2-CHBr-CH_3 \xrightarrow[\text{ZnCl}_2 \text{ or other mild ionic catalyst}]{150°-250° C.}$$

$$Cl_2C=\overset{H}{C}-\overset{H}{C}=CH_2 + HCl + HBr$$

The product, 1,1-dichlorobutadiene-1,3, may be polymerized by conventional techniques used in the polymerization of conjugated unsaturated compounds to yield polymers and copolymers having useful properties. The product may also be employed for insecticidal and other uses, and may be employed as an intermediate in the synthesis of still other compounds.

It is to be understood that carbon tetrachloride may be substituted for trichlorobromomethane in reaction A and the resulting 1,1,1,3-tetrachlorobutane dehydrochlorinated to the desired 1,1-dichlorobutadiene as in reaction B.

Referring to reaction (A), this may be carried out by contacting the trichlorobromomethane and propylene, conveniently by bubbling the propylene through the trichlorobromomethane. The reaction may be catalyzed by irradiating the reaction mass with ultraviolet light. Alternatively, the necessary free radicals may be supplied by incorporating peroxidic compounds such as benzoyl peroxide, acetyl peroxide, di-t-butyl peroxide and the like into the reaction mass. The reaction may be carried out at room temperature, but other temperatures may be used, since the progress of reaction is not greatly dependent upon temperature. With the use of peroxidic catalysts, of course, the temperature must be sufficiently high to insure the generation of an adequate supply of free radicals in the system used. In general, temperatures from 50° C. to 150° C. will be found suitable. As noted above, a convenient mode of operation consists in bubbling the propene into liquid trichlorobromomethane, in which case it may be desirable to conduct the reaction under pressure in order to prevent losses due to volatilization.

The overall effect of reaction (B) is a dehydrohalogenation of the 1,1,1-trichloro-3-bromobutane, which might conceivably be effected by alkali treatment. However, this does not appear to be feasible, due to etherification, carboxylic group generation etc. Reaction (B), whereby hydrogen halides are spontaneously liberated by the action of a catalyst, is highly satisfactory. Zinc chloride is the preferred catalyst for this purpose; however, other mildly catalytic salts of strong acids with weak bases may be employed, such as ferric and ferrous chlorides, mercuric chloride, cadmium chloride, zinc sulfate and the like. Strongly catalytic salts of this type, such as aluminum chloride, are likewise effective to liberate hydrogen halides; as an interesting sidelight, aluminum chloride when added to 1,1,1-trichloro - 3 - bromo-butane causes spontaneous and endothermic evolution of the theoretical amounts of hydrogen halides, with marked chilling effect. Unfortunately, these stronger catalysts also bring about the formation of tarry polymers of the desired product. With the use of the mildly catalytic salts, the reaction progresses with satisfactory speed at temperatures in the range 150°-250° C.

The 1,1-dichlorobutadiene-1,3 produced in accordance with this invention may readily be polymerized to yield rubbery polymers by means of the techniques usually employed in the polymerization of butadiene-type materials. The compound also copolymerizes with other unsaturated compounds capable of copolymerizing with butadiene-type compounds, such as styrene, acrylonitrile, acrylic esters, vinyl esters and ethers, vinylidene halides and the like.

With the foregoing general discussion in mind, there are given herewith detailed examples of the practice of this invention. All parts given are by weight.

EXAMPLE I

*Monomeric 1,1-dichlorobutadiene-1,3*

A. Preparation of 1,1,1-trichloro-3-bromobutane:

| | Parts |
|---|---|
| Trichloro - bromo - methane | 1819 |
| Propylene | 338 |

A Pyrex flask fitted with a fritted glass gas bubbler and reflux condenser was provided for this preparation. The flask was cooled by an external stream of city water, and exposed to a mercury vapor lamp having strong output in the region of 2500–5000 Å. The reflux condenser was vented through a mercury well providing a back pressure of about 300 mm.

The trichloro-bromo-methane was charged into the flask, and the propylene bubbled in through the fritted glass bubbler over a period of 44 hours. The resultant mass was distilled at room temperature under vacuum to remove the unreacted trichloro-bromo-methane, 231 parts of this being recovered. The residual crude 1,1,1-trichloro-3-bromo-butane was then distilled under 18 mm. pressure, the fraction coming over at 86°–86.5° C. being taken as pure material. The yield was 93%, based on trichloro-bromo-methane used and not recovered. Properties of the product were: melting point −56° to −55° C.; boiling point at 18 mm. 86°–86.5° C.; $d^{20}$ 1.660; $n_D^{25}$ 1.5040.

B. Preparation of 1,1-dichlorobutadiene-1,3:
  1,1,1-trichloro-3-bromo-butane (prepared as just described), 409 parts
  Zinc chloride, 3 portions of 20 parts each A flask surmounted by a reflux condenser venting to a water scrubbing train was provided for this preparation. A heating jacket was provided for the flask.

The first portion of the zinc chloride was charged into the flask, which was heated to 180°–220° C., and kept within this range throughout the reaction to follow. The 1,1,1-trichloro-3-bromo-butane was fed into the flask over a period of 5 hours, the reaction being interrupted twice for the addition of the second and third portions of zinc chloride. Hydrogen halides were evolved and absorbed in the scrubbing train; an aliquot portion of the liquor in the train was titrated at the end of the run, and it was found that 84.5% of the theoretical amount of hydrogen bromide and hydrogen chloride required by reaction B had been collected. The crude reaction mass at the close of the run amounted to 212 parts.

The crude reaction mass was washed with water, dried over anhydrous sodium sulfate, and distilled through a packed column, yielding 66 parts of unreacted 1,1,1-trichloro-3-bromo-butane and 45 parts (22.1% of theory, based on the weight of 1,1,1-trichloro-3-bromo-butane used and not recovered) of 1,1-dichlorobutadiene-1,3. The product had the following properties: melting point −82° C.; boiling point 47.5° C. at 100 mm. of mercury absolute pressure; $d_4^{20}$ 1.177; $n_D^{20}$ 1.5027; chlorine 57.35%, theory 57.66%. A qualitative test indicated no bromine present.

EXAMPLE II

*Polymerization of 1,1-dichlorobutadiene-1,3*

|  | Parts |
|---|---|
| 1,1-dichlorobutadiene-1,3 (prepared as just described) | 100 |
| Water | 300 |
| Monosulfated monoglyceride of fatty acids containing 12–18 carbon atoms (Arctic Syntex M, manufactured by the Colgate-Palmolive-Peet Co.) | 3 |
| Potassium persulfate | 1.5 |
| n-Octyl mercaptan | 1 |

The above ingredients were charged into a pressure vessel and agitated at 50° C. for 48 hours. The resultant latex was coagulated by treatment with methanol, dewatered on a filter, and the curd washed on the filter with water. The product was a rubbery polymer which could be vulcanized.

*Copolymers of 1,1-dichlorobutadiene-1,3*

|  | Parts |
|---|---|
| 1,1-dichlorobutadiene-1,3 (prepared as described above) | 75 |
| Comonomer (styrene, acrylonitrile, butadiene, vinyl acetate or vinylidene chloride) | 25 |
| Water | 300 |
| Sodium lauryl sulfate | 3 |
| Ammonium persulfate | 1.5 |
| Lauryl mercaptan | 1 |

A series of copolymers was made in accordance with the foregoing schedule, using one of the named comonomers in each copolymer, making 5 copolymers in all. In each case the ingredients were charged into a polymerization vessel and agitated at 40° C. for 48 hours. The resultant latex was coagulated by treatment with methanol, and dewatered and washed with water on a filter.

In each case there was obtained a rubbery copolymer capable of compounding and vulcanization to yield products of technical interest.

From the foregoing general discussion and detailed specific examples, it will be seen that the compound 1,1-dichlorobutadiene-1,3, provided by this invention, is a product of considerable technical excellence which may be polymerized and copolymerized to yield rubbery products. The compound of this invention is also adapted to serve as an intermediate in the preparation of chlorine-containing oxides, glycols, etc. The compound may also be used as an insecticide, and as an intermediate for 1,1,1,2,3,4-hexachlorobutane, which may also be used as an insecticide. In accordance with the process of this invention, this compound may be prepared from the readily and cheaply available trichloro-bromo methane and propene, by the use of cheaply available equipment and with only moderately skilled attendance.

What is claimed is:
1. 1,1-dichlorobutadiene-1,3.
2. Polymeric 1,1-dichlorobutadiene-1,3.
3. Copolymers of 1,1 - dichlorobutadiene - 1,3 with up to 25% of other ethylenically unsaturated compounds copolymerizable therewith and selected from the group consisting of styrene, acrylonitrile, butadiene, vinyl acetate, and vinylidene chloride.
4. Process of preparing 1,1-dichlorobutadiene-1,3 which comprises contacting 1,1,1-trichloro-3-bromo-butane with zinc chloride at a temperature in the range 150°–250° C.
5. Process of preparing 1,1-dichlorobutadiene-1,3 which comprises contacting a compound selected from the group consisting of 1,1,1,3-tetrachlorobutane and 1,1,1-trichloro-3-bromobutane with a mildly catalytic salt selected from the group consisting of ferric chloride, ferrous chloride, mercuric chloride, cadmium chloride, and zinc sulfate at a temperature in the range 150°–250° C.
6. Process of preparing 1,1-dichlorobutadiene-1,3 which comprises contacting 1,1,1-trichloro-3-bromobutane with zinc chloride at a temperature in the range 150°–250° C.

GRANT CRANE.
KENNETH C. EBERLY.

REFERENCES CITED

The following references are of record in the file of this patent:

UNITED STATES PATENTS

| Number | Name | Date |
|---|---|---|
| 1,965,369 | Carothers et al. | July 3, 1934 |

FOREIGN PATENTS

| Number | Country | Date |
|---|---|---|
| 418,469 | Great Britain | Oct. 25, 1934 |